(12) United States Patent
Lee

(10) Patent No.: US 7,674,380 B2
(45) Date of Patent: Mar. 9, 2010

(54) APPARATUS FOR TREATING SEWAGE USING A SEMI-BATCH PROCESS AND ASSOCIATED METHOD

(75) Inventor: Kwang Hee Lee, Gyeongju-si (KR)

(73) Assignee: Essa Co., Ltd., Gyeongju-si (KR)

( * ) Notice: Subject to any disclaimer, the term of this patent is extended or adjusted under 35 U.S.C. 154(b) by 0 days.

(21) Appl. No.: 12/158,437

(22) PCT Filed: Oct. 31, 2006

(86) PCT No.: PCT/KR2006/004468

§ 371 (c)(1),
(2), (4) Date: Jun. 20, 2008

(87) PCT Pub. No.: WO2007/078047

PCT Pub. Date: Jul. 12, 2007

(65) Prior Publication Data

US 2009/0001016 A1 Jan. 1, 2009

(30) Foreign Application Priority Data

Dec. 30, 2005 (KR) ...................... 10-2005-0134767

(51) Int. Cl.
*C02F 3/30* (2006.01)
(52) U.S. Cl. ...................... 210/609; 210/629; 210/630; 210/259; 210/903; 210/906
(58) Field of Classification Search ................. 210/605, 210/608, 609, 621–623, 629, 630, 252, 259, 210/903, 906
See application file for complete search history.

(56) References Cited

U.S. PATENT DOCUMENTS 5,616,241 A * 4/1997 Khudenko .................. 210/151
5,989,428 A * 11/1999 Goronszy .................. 210/605
6,015,496 A * 1/2000 Khudenko .................. 210/603

(Continued)

FOREIGN PATENT DOCUMENTS

| DE | 19640761 C1 | * | 3/1998 |
| JP | 59-032999 A | | 2/1984 |
| KR | 10-1997-0020988 | | 5/1997 |
| KR | 10-2004-0044702 | | 5/2004 |

OTHER PUBLICATIONS

International Search Report dated Jan. 30,2007, of PCT/KR2006/004468.

*Primary Examiner*—Fred Prince
(74) *Attorney, Agent, or Firm*—KED & Associates, LLP

(57) ABSTRACT

An apparatus for treating sewage using a semi-batch process is provided. The apparatus may include an aeration tank, a thickening tank, a dephosphorization tank, and first and second reactor basins. The first and second reactor basins may each include an opening portion formed by opening a side wall thereof so as to be connected with a lateral portion of the aeration tank and an aeration unit installed therein. The apparatus may also include a flow distribution pipe including a start pipe and a pair of flow pipes, a pair of stirrers each provided at a respective side of the auxiliary pipes in each of the pair of flow pipes, operating in turn to stir the dephosphorized sewage overflowing from the dephosphorization, and a decanter installed across the top of the side opposite to the opening portions of the first and second reactor basins.

12 Claims, 5 Drawing Sheets

U.S. PATENT DOCUMENTS

| | | | |
|---|---|---|---|
| 6,190,554 B1* | 2/2001 | Mandt | 210/605 |
| 6,767,462 B2* | 7/2004 | Park | 210/605 |
| 2003/0038080 A1* | 2/2003 | Vriens et al. | 210/605 |
| 2003/0136732 A1* | 7/2003 | Park | 210/605 |
| 2007/0029240 A1* | 2/2007 | Reid | 210/195.3 |
| 2007/0108125 A1* | 5/2007 | Cho et al. | 210/605 |

* cited by examiner

US 7,674,380 B2

APPARATUS FOR TREATING SEWAGE USING A SEMI-BATCH PROCESS AND ASSOCIATED METHOD

TECHNICAL FIELD

The present invention relates to an apparatus for treating sewage using a semi-batch process and an associated method thereof and, more particularly, to an apparatus for the treatment of sewage and a method thereof that remove nitrogenous and phosphorus compounds as well as organic materials included in the sewage by applying a sequencing batch reactor (SBR) process.

BACKGROUND ART

In general, nitrogenous and phosphorus materials that result in eutrophication as well as organic materials are included in sewage.

If sewage including such nitrogenous and phosphorus materials flows in rivers, red tide or green tide occurs due to eutrophication that decreases dissolved oxygen in the river water, which may destroy the ecosystem and, further, contaminate a water supply system.

To solve such a problem, various advanced sewage treatment processes aimed at removing nitrogenous and phosphorus compounds as well as organic materials during the sewage treatment process have been proposed.

Among them, a sequencing batch reactor (SBR) process is a method for the treatment of sewage, in which a filling process, a reaction process, a settling process, a drawing process and an idle process proceed sequentially according to the lapse of time in a single reactor basin, that removes organics, nitrogenous and phosphorus compounds in sewage biologically using microorganisms in anaerobic, aerobic and anoxic conditions.

Dephosphorization reaction that discharges phosphorus from sewage occurs in the anaerobic condition of the SBR process. Organic decomposition, phosphorus absorption by microorganisms and nitrification reaction of sewage occur in the aerobic condition. Denitrification reaction of sewage takes place to remove nitrogen of sewage in the anoxic condition.

Since the SBR process uses a single reactor basin, the SBR process has advantages in that it is possible to reduce the size of sewage treatment facilities, it does not require a separate settling basin, and it provides convenience of operation with an automated facility, thus saving labor cost.

However, the SBR process using a single reactor basin has also some drawbacks in that time is required for converting the condition of the reactor basin into pure anaerobic, pure aerobic and pour anoxic conditions, respectively, since the anaerobic, aerobic and anoxic conditions are to be provided in the single reactor basin based on the lapse of time.

Accordingly, it is difficult to maintain the respective pure conditions separately in the SBR process using the single reactor basin. That is, if the anoxic process in which the nitrified sewage is denitrified is converted into the anaerobic condition, the denitrification reaction of the remaining nitrogen takes precedence, thus deteriorating dephosphorization efficiency and, further, phosphorus absorptance in the subsequent aerobic condition.

DISCLOSURE

Technical Problem

The present invention have been contrived taking the above-described circumstances into consideration and, an object of the present invention is to provide an apparatus for treatment of sewage using semi-batch and a method thereof that include a separate dephosphorization tank for improving the dephosphorization and the denitrification efficiencies as a modified method of the SBR process.

Other objects and advantages of the present invention will be described below and identified by preferred embodiments of the present invention. Moreover, the objects and advantages of the present invention can be embodied by means and combinations set forth in the appended claims.

Technical Solution

To accomplish the above objects of the present invention, there is provided an apparatus for treatment of sewage using semi-batch comprising an aeration tank, in which an aeration unit aerating sewage continuously to be in an aerobic condition is installed; a thickening tank, of which the top is open, including side walls having a height lower than that of the aeration tank and arranged in the aeration tank, for continuously settling and thickening sludge of sewage aerated in the aeration tank and overflowing therein in an anoxic condition and, then, discharging the thickened sludge to the outside by a pump; a dephosphorization tank, including an anti-swirl plate established on the bottom thereof, of which the width narrows toward the top, for receiving upwardly raw water and the thickened sludge discharged from the thickening tank, stirring the same in an anaerobic condition, and continuously overflowing dephosphorized sewage through a weir established on the top circumference thereof; a first reactor basin and a second reactor basin, each including an opening portion, formed by opening a side wall thereof to be connected with a lateral portion of the aeration tank, and an aeration unit installed therein, the first reactor basin and the second reactor basin being arranged in parallel in the longitudinal direction; a flow distribution pipe including a start pipe, connected with a lateral portion of the weir of the dephosphorization tank and extending toward the bottom, and a pair of flow pipes, each extending from an end of the start pipe and curved to be parallel to the bottoms of the first reactor basin and the second reactor basin in the longitudinal direction and including an auxiliary pipe at one side thereof; a pair of stirrers, each being established at one side of the auxiliary pipes in each of the pair of flow pipes, operating in turn to stir the dephosphorized sewage overflowing from the dephosphorization tank to the first reactor basin and the second reactor basin alternately; and a decanter, installed cross the top of the opposite side to the opening portions of the first reactor basin and the second reactor basin, for alternately decanting purified supernatant overflowing in turn from the first reactor basin and the second reactor basin.

Moreover, it is desirable that each of the pair of flow pipes include a plurality of vents arranged toward the respective bottoms of the first reactor basin and the second reactor basin in the longitudinal direction at regular intervals; each of the auxiliary pipes include a bent pipe, having a diameter smaller than that of the flow pipe and extending from the vent that is most adjacent to each of the opening portions of the first reactor basin and the second reactor basin and bent from the bottom to the top in a shape of "U", and a penetration pipe, having a diameter larger than that of the bent pipe, connected with an extended end of the bent pipe and extending parallel to the flow pipe in the longitudinal direction; and each of the pair of stirrers be established between the opening portion and the penetration pipe in the first reactor basin and the second reactor basin, the pair of stirrers operating in turn so that a flow path is formed inside the single penetration pipe to cause a pressure difference between the pair of flow pipe, while the single stirrer performs the stirring process toward the single penetration pipe corresponding to the lateral portion thereof, thus leading the sewage to flow in the single reactor basin, where the single stirrer operates, and the single flow pipe provided in the single reactor basin.

Furthermore, it is desirable that the opening portion, included in the aeration tank, have a shape in that the width narrows toward the aeration tank and include a vent plate having a plurality of vents established on an end that has the maximum width of the opening portion.

In addition, the decanter includes a central motor, a first discharger and a second decanter, the first discharger and the second discharger being connected with both sides of the central motor and established on the top of the opposite side to the first reactor basin and the second reactor basin, and including an opening surface established on the lateral sides thereof in the form of a conduit, respectively, the first discharger and the second discharger being rotated in the opposite direction to each other by the rotation of the central motor to expose the respective opening surfaces to the surface of supernatant of the first reactor basin and the second reactor basin in turn, and the central motor being suspended while one of the opening surfaces is exposed so as to maintain decantation from one of the first reactor basin and the second reactor basin.

Moreover, it is desirable that the dephosphorization tank be provided in the aeration tank and include a side wall having a height higher than that of the aeration tank so that the dephosphorized sewage overflowing through the weir may not be mixed with the sewage aerated in the aeration tank.

Furthermore, the aeration unit may include an aeration pipe, through which oxygen is supplied from the outside, established on the aeration tank, the first reactor basin and the second reactor basin, and a plurality of nozzles, through which oxygen is discharged, provided on the top of the aeration pipe at regular intervals.

To accomplish the above objects of the present invention, there is provided a method for treating sewage using semi-batch comprising: a step of aerating sewage continuously to be nitrified in an aerobic condition in an aeration tank; a step of settling sludge overflowing into a thickening tank established in the aeration tank continuously in an anoxic condition to be thickened during the step of aerating; a step of releasing phosphorus by dephosphorizing bacteria in an anaerobic condition by continuously and upwardly transferring and stirring the sludge thickened in the bottom of the thickening tank together with newly-filled raw water; a step of distributing dephosphorized sewage overflowing from the dephosphorization tank bidirectionally by a flow distribution pipe to flow in a first reactor basin and a second reactor basin in turn; and a semi-batch reaction step, in which, while stirring, aeration, settling and discharging processes of filled sewage occur in turn in the first reactor basin, settling, discharging, stirring and aeration processes occur in turn in the second reactor basin correspondingly thereto.

Here, the semi-batch reaction step may comprise: a first reaction step, in which, while the dephosphorized sewage is introduced and stirred in the first reactor basin, aerated sewage of the previous step is settled in the second reactor basin without an inflow of the dephosphorized sewage to generate clear supernatant in the top of the settled sludge; a second reaction step, in which, while the dephosphorized sewage flows in the first reactor basin and the sewage stirred in the first reaction step is aerated, the aerated sewage is repeatedly aerated while passing through the aeration tank and flows in the second reactor basin, of which the water level is lower relatively and, accordingly, supernatant on the top of the settled sludge generated in the first reaction step overflows to be discharged by the inflow pressure; a third reaction step, in which, while the inflow of the dephosphorized sewage is stopped in the first reactor basin and the sewage aerated in the second reaction step is settled to generate clear supernatant on the top of the settled sludge, the dephosphorized sewage is introduced and stirred in the second reactor basin; and a fourth reaction step, in which, while the dephosphorized sewage flows in the second reactor basin and the sewage stirred in the third reaction step is aerated, the aerated sewage is repeatedly aerated while passing through the aeration tank and flows in the first reactor basin, of which the water level is lower relatively and, accordingly, supernatant on the top of the settled sludge generated in the third reaction step overflows to be discharged by the inflow pressure.

Moreover, while the sewage is stirred or settled, the first reactor basin and the second reactor basin are being under the anoxic condition, respectively, where the denitrification reactions by denitrifying microorganisms may occur; while the sewage is aerated, the first reactor basin and the second reactor basin are being under the aerobic condition, respectively, where nitrifications by aerobic microorganisms and phosphorus absorptions by dephosphorizing bacteria may occur; while the aerated sewage is repeatedly aerated while passing through the aeration tank, the nitrification and the phosphorus absorption may occur repeatedly; and while the supernatant is discharged, the first reactor basin and the second reactor basin are being under the anoxic condition, respectively, where the denitrification reactions by the denitrifying microorganisms may occur.

Furthermore, it is possible to remove phosphorus by getting rid of the sludge absorbing phosphorus in the first reactor basin, while the sewage of the first reactor basin is aerated in the second reaction step, and remove phosphorus by getting rid of the sludge absorbing phosphorus in the second reactor basin, while the sewage of the second reactor basin is aerated in the fourth reaction step.

In addition, it is possible to enhance an efficiency of phosphorus absorption of sludge in the first reactor basin by increasing the stirring speed of the dephosphorization tank to raise the amount of overflowing dephosphorized sewage, while the sewage of the first reactor basin is aerated in the second reaction step, and enhance an efficiency of phosphorus absorption of sludge in the second reactor basin by increasing the stirring speed of the dephosphorization tank to raise the amount of overflowing dephosphorized sewage, wherein while the sewage of the second reactor basin is aerated in the fourth reaction step.

Additionally, after performing the first reaction step and the second reaction step, the first reaction step and the second reaction step are repeated once more and, then, the third reaction step may be carried out.

ADVANTAGEOUS EFFECTS

The apparatus for treating sewage using a semi-batch process and the associated method thereof in accordance with the present invention provide the following effects:

First, it provides excellent dephosphorization and denitrification efficiencies and does not require a separate chemical facility for the treatment of phosphorus as the dephosphorization tank is established separately.

Second, it is possible to maintain the sludge of the dephosphorization tank in high concentrations, thus providing stable dephosphorization efficiency against the inflow of sewage low concentration, since sludge is thickened in the thickening tank and transferred to the dephosphorization tank; it is possible to reduce the volume of the dephosphorization tank, to which sludge is transferred, thus facilitating the fabrication and the convenient maintenance, and saving the installation cost; and it is possible to establish the dephosphorization tank in the aeration tank, thus having a strong resistant against the impact load applied thereto.

Third, it is possible to provide stable treatment efficiency of sewage since it uses two semi-batch reactor basins, i.e., the first reactor basin and the second reactor basin, through which the sewage is introduced in turn; and it is possible to increase the amount of the sewage treatment and cover the flux changes appropriately since the discharging cycle is shorter than the sequencing batch reactor process due to the alternate operations of the decanter.

Fourth, it is possible to fabricate and install the decanter of low cost and provide high discharging efficiency and stable treated water quality, since the depth of supernatant is low due to the short discharging cycle.

Fifth, it has stable dephosphorization efficiency due to the continuous flows of the aeration tank, thickening tank and dephosphorization tank, and it is possible to remove organic materials, nitrogenous and phosphorus compounds effectively by performing the nitrogen removal process of the sequential batch of temporal concept in the first reactor basin and the second reactor basin separately from the phosphorus removal process in the dephosphorization tank to maintain the pure anaerobic, pure aerobic and pure anoxic conditions.

BEST MODE

Hereinafter, preferred embodiments of the present invention will now be described with reference to the accompanying drawings. First of all, terms and words used in the specification and the claims should be interpreted not in a limited normal or dictionary meaning, but to include meanings and concepts conforming with technical aspects of the present invention, based on the fact that the inventor may appropriately define a concept of a term to describe his/her own invention in a best way.

Therefore, the configurations described in the specification and drawn in the figures are just most preferred embodiments of the present invention, not to show all of the technical aspects of the present invention. So, it should be understood that there might be various equalities and modifications to be replaced with them at this point of time when the present application is filed.

Figure 1:
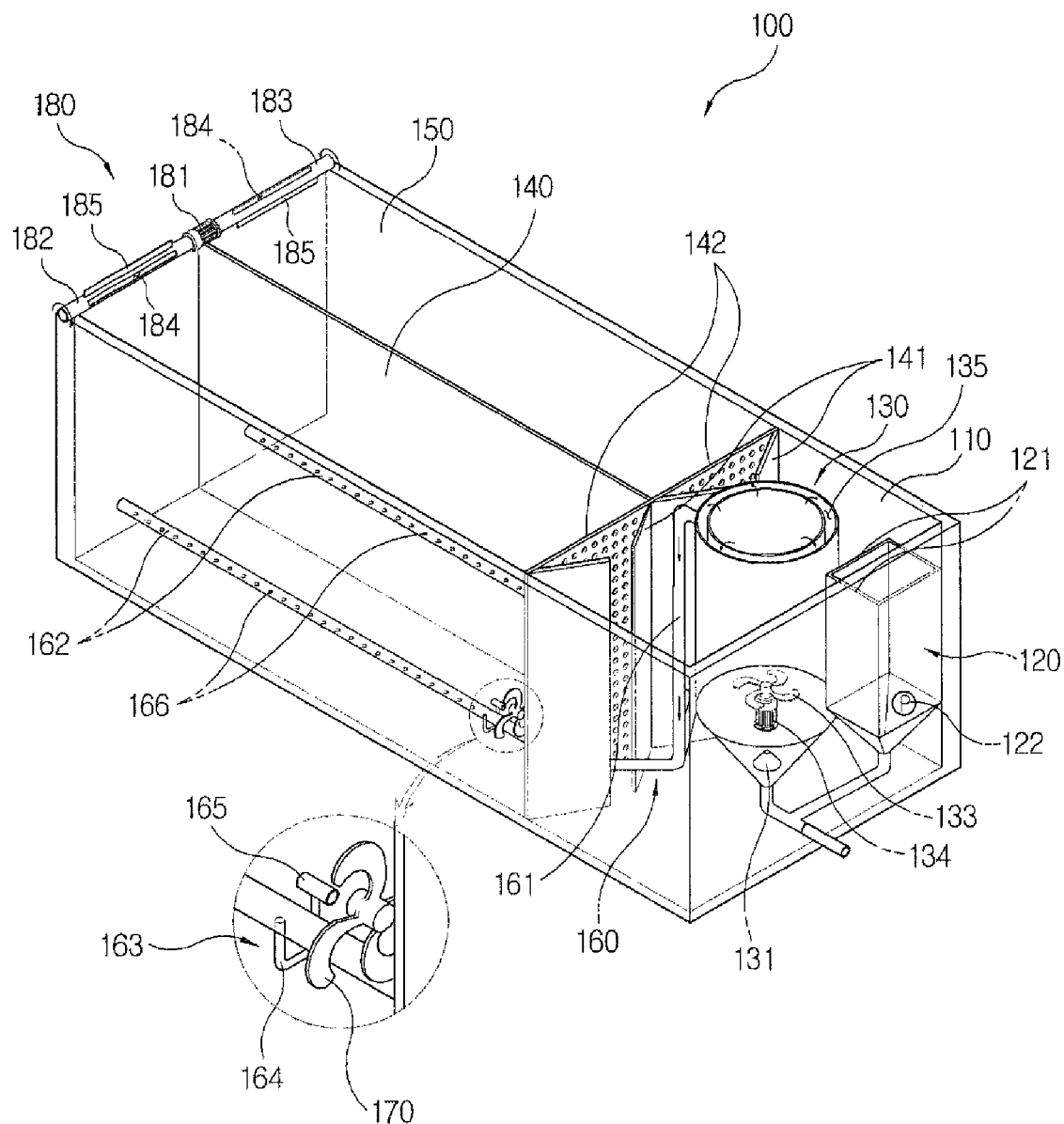
FIG. 1 is a schematic perspective view depicting an apparatus for treating sewage using a semi-batch process in accordance with a preferred embodiment of the present invention.
Figure 2:
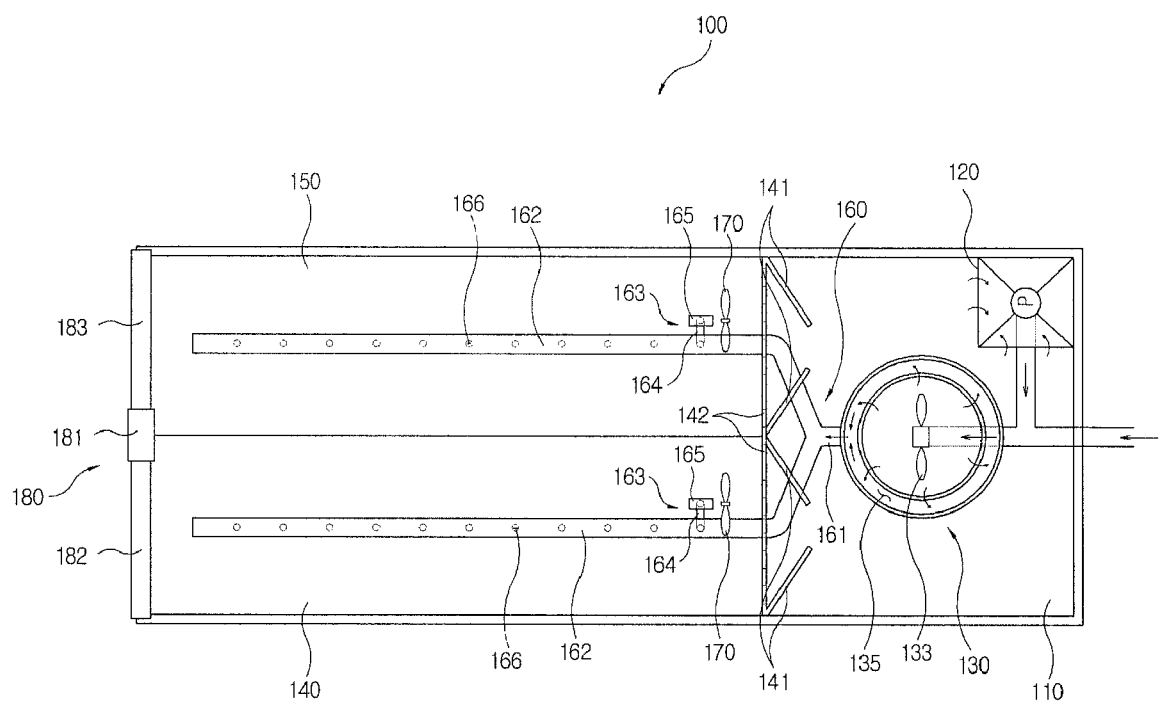
FIG. 2 is a plane view of FIG. 1.
Figure 4:
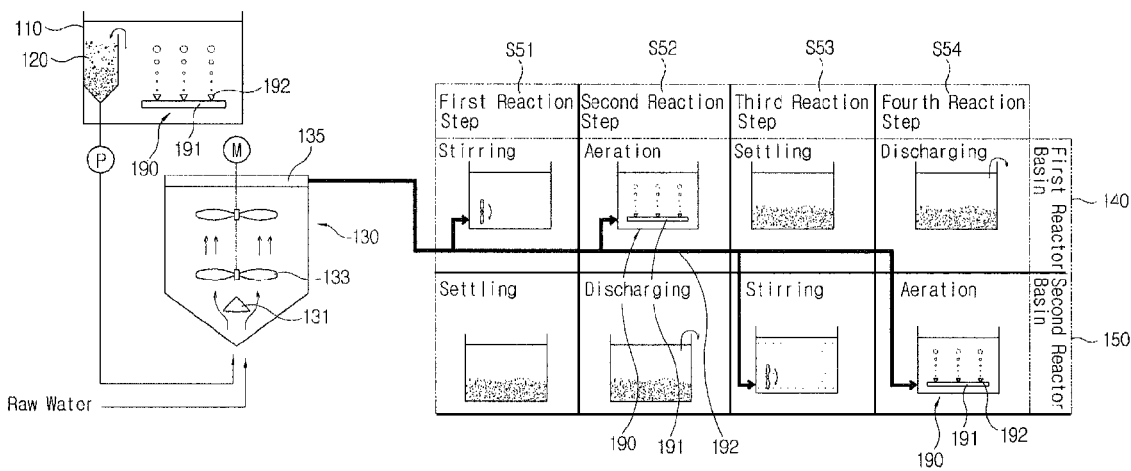
FIG. 4 is a diagram illustrating how sewage is treated in the apparatus of FIG. 1.

FIG. 1 is a schematic perspective view depicting an apparatus for treating sewage using a semi-batch process in accordance with a preferred embodiment of the present invention, FIG. 2 is a plane view of the apparatus for treating sewage depicted in FIG. 1, and FIG. 4 is a diagram illustrating how sewage is treated in the apparatus for treating sewage depicted in FIG. 1.

As depicted in the figures, the apparatus 100 for the semi-batch treatment of sewage comprises an aeration tank 110, a thickening tank 120, a dephosphorization tank 130, a first reactor basin 140, a second reactor basin 150, a flow distribution pipe 160, a stirrer 170 and a decanter 180.

The aeration tank 110 is an element that keeps the aerobic condition by aerating oxygen continuously to activate aerobic microorganisms included in sewage so as to decompose organic materials and to promote the nitrification process of sewage and the phosphorus absorption by dephosphorizing bacteria, and may include an aeration unit 190 aerating oxygen therein.

Here, the nitrification process of sewage means that ammonia nitrogen ($NH_{4^+}$) of sewage is converted into nitrate nitrogen ($NO_{3^-}$) by aerobic microorganisms included in filled sewage in the aerobic condition.

Moreover, the phosphorus absorption denotes that the dephosphorizing bacteria that inhabit sludge excessively take in phosphorus included in sewage using organic materials in sewage, thus removing phosphorus by getting rid of sludge in which phosphorus is absorbed by the excessive intake.

Meanwhile, as depicted in FIG. 4, the aeration unit 190 established on the bottom of the aeration tank 110 may include an aeration pipe 191, through which oxygen is supplied from the outside, and a plurality of nozzles 192, through which oxygen is discharged, provided on the top of the aeration pipe 191 at regular intervals. The aeration unit 190 continues to operate in the aeration tank 110 and at least one aeration unit 190 may be established in parallel with a plurality of pipes on the bottom of the aeration tank 110.

The thickening tank 120, of which the top is open, includes side walls 121 having a height lower than that of the aeration tank 110 and is arranged at one side in the aeration tank 110. On the bottom of such thickening tank 120, sludge of sewage aerated in the aeration tank 110 and overflowing over the side walls 121 therein is continuously settled and thickened by gravity, and the thickened sludge may be discharged to the outside by a pump 122 arranged on the bottom.

Here, the thickening tank 120 settles and thickens sludge, while maintaining the anoxic condition intercepted from the aerobic condition of the aeration tank 110 by the side walls 121.

The lower part of the thickening tank 120 has a hopper shape that the width narrows toward the bottom so as to enhance thickening efficiency, and a connection pipe, through which thickened sludge is discharged, may be established on the bottom.

The dephosphorization tank 130 receives upwardly raw water, corresponding to sewage or wastewater to be treated, and the thickened sludge discharged from the thickening tank 120 through a pipe, stirs the same with a dephosphorization stirrer 133 driven by a dephosphorization motor 134 to release phosphorus, and overflows the dephosphorized sewage through a weir 135 established on the top circumference thereof.

The dephosphorizing bacteria included in the thickened sludge release phosphorus using volatile fatty acid (VFA) included in the filled raw water in the dephosphorization tank 130 where the anaerobic condition that oxygen and nitrate nitrogen $NO_3$- do not exist is maintained.

An anti-swirl plate 131 may be established on the bottom of the dephosphorization tank 130 so that the thickened sludge and sewage flowing from the bottom of the dephosphorization tank 130 may be supplied slowly and upwardly, not causing a rushing stream.

Meanwhile, the weir 135 is a groove, formed in the circumferential direction on the top of the dephosphorization tank 130, eliminates dead spaces while the sewage overflows over the aeration tank 110, thus making the water current flow smoothly. One side of the weir 135 is connected with an end of the flow distribution pipe 160 to discharge the sewage overflown through the weir 135.

Moreover, since the dephosphorization tank 130 receives the sludge thickened in the thickening tank 120 to process the dephosphorization, it has stable dephosphorization efficiency against the inflow of sewage of low concentration and the volume of the tank may be minimized compared with that of non-thickening transfer process.

For these reasons, the dephosphorization tank 130 can be mounted in the aeration tank 110 and, in this case, it is desirable that the dephosphorization tank 130 include a side wall having a height higher than that the aeration tank 110 so that the dephosphorization efficiency and the phosphorus absorption efficiency may not be decreased due to the confluence of the dephosphorized sewage overflowing through the weir 135 and the sewage aerated in the aeration tank 110.

The dephosphorization tank 130 mounted in the aeration tank 110 may be readily fabricated with fiber glass reinforced plastic (FRP), stainless, etc. Accordingly, it provides convenient maintenance and has a strong resistance against the impact load applied when sewage of high concentration is introduced, and it is possible to save the installation cost due to the decrease of the tank volume.

As described above, the present invention provides advantages in that it provides excellent dephosphorization and denitrification efficiencies and does not require a separate chemical facility for the treatment of phosphorus as the dephosphorization tank 130 is separately established to be divided from the thickening tank 120.

Meanwhile, the first reactor basin 140 and the second reactor basin 150 including an opening portion 141 that is formed by opening a side wall thereof to be connected with a lateral portion of the aeration tank 110 are arranged in parallel in the longitudinal direction, and an aeration unit 190 may be established on the bottoms thereof.

As depicted in FIG. 4, each of the aeration units 190 installed in the first reactor basin 140 and the second reactor basin 150 includes an aeration pipe 191, through which oxygen is supplied from the outside, and a plurality of nozzles 192, through which oxygen is discharged, so as to have the same function as the aeration unit 190 established in the aeration tank 110. At least one aeration unit 190 may be established in parallel with a plurality of pipes on the bottoms of the first reactor basin 140 and the second reactor basin 150, and the aeration units 190 can operate intermittently and in turn in the respective reactor basins based on an external control.

Meanwhile, the opening portion 141, included in the aeration tank 110, has a shape in that the width narrows toward the aeration tank 110 and includes a vent plate 142 having a plurality of vents established on an end that has the maximum width of the opening portion 141.

As above, such changes applied to the width of the opening portion 141 provide effects in that the aeration may be activated by increasing the flow velocity while sewage moves from the first reactor basin 140 or from the second reactor basin 150 to the aeration tank 110 and, on the contrary, the opening portion 141 acts as a buffer so that the stirring, settling, aerating and discharging processes that occur in the respective reactor basins may be well maintained, that is, so that the conditions in the respective reactor basins may not be changed rapidly by reducing the flow velocity.

Furthermore, the vent plate 142 decreases the flow velocity while sewage moves from the aeration tank 110 to the first reactor basin 140 or to the second reactor basin 150, thus helping the sludge included in the sewage to be introduced and settled slowly.

Meanwhile, the flow distribution pipe 160 coupled with a lateral portion of the weir 135 established on the top of the dephosphorization tank 130 transfers the dephosphorized sewage overflowing from the dephosphorization tank 130 to the first reactor basin 140 and the second reactor basin 150 and includes a start pipe 161 and a pair of flow pipes 162.

The start pipe 161 is connected with a lateral side of the weir 135 of the dephosphorization tank 130 and extends from the lateral portion of the aeration tank 110 to the bottom.

Each of the pair of flow pipes 162 extending from an end of the start pipe 161 and curved to be parallel to the bottoms of the first reactor basin 140 and the second reactor basin 150 in the longitudinal direction, includes an auxiliary pipe 163 at one side thereof.

A plurality of vents 166, arranged toward the respective bottoms of the first reactor basin 140 and the second reactor basin 150 in the longitudinal direction at regular intervals, for discharging sewage downward so as not to cause a rapid rising stream for the filled sewage, is provided in the pair of flow pipes 162.

Each of the auxiliary pipes 163 includes a bent pipe 164 and a penetration pipe 165. Each of the bent pipes 164 having a diameter smaller than that of the flow pipe 162 extends from the vent 166 that is most adjacent to each of the opening portions 141 of the first reactor basin 140 and the second reactor basin 150 and bent from the bottom to the top in a shape of "U". Each of the penetration pipes 165 having a diameter larger than that of the bent pipe 164 is connected with an extended end of the bent pipe 164 and extends parallel to the flow pipe 162 in the longitudinal direction.

Meanwhile, each of the pair of stirrers 170 is established at one side of the auxiliary pipe 163 in each of the pair of flow pipes 162, and the pair of stirrers 170 operates in turn to stir the dephosphorized sewage overflowing from the dephosphorization tank 130 to the first reactor basin 140 and the second reactor basin 150 alternately.

That is, each of the pair of stirrers 170 is established between the opening portion 141 and the penetration pipe 165 in the first reactor basin 140 and the second reactor basin 150, and the pair of stirrers 170 operates in turn so that the flow of sewage is let to only one flow pipe 162 mounted in one reactor basin where one stirrer 170 is driven.

For example, if the stirrer 170, the flow pipe 162, the bent pipe 164 and the penetration pipe 165 included in the first reactor basin 140 are referred to as a first stirrer, a first flow pipe, a fist bent pipe and a first penetration pipe, respectively, for the sake of convenience, a flow path is formed inside the first penetration pipe to cause a pressure difference between the pair of flow pipes 162 while the first stirrer proceeds with the stirring process toward the first penetration pipe corresponding to the lateral portion.

Due to the pressure difference caused by the stirring process and the diameter of the first bent pipe smaller than that of the first flow pipe, the flow velocity of sewage flowing in is increased while passing through the first bent pipe and, accordingly, the flow of sewage is led only to the first flow pipe established in the first reactor basin 140, where the first stirrer operates. Such sewage flows out through the plural vents 166 formed following the auxiliary pipe 163.

Moreover, the flow velocity increased while passing through the respective bent pipes 164 is decreased while passing through the penetration pipe 165 having a diameter larger than that of the bent pipe 164, thus preventing a rushing stream of sewage.

The decanter 180, installed cross the top of the opposite side to the opening portions 141 of the first reactor basin 140 and the second reactor basin 150, includes a central motor 181, a first discharger 182 and a second discharger 183 so as to alternately decant the purified supernatant overflowing in turn from the first reactor basin 140 and the second reactor basin 150.

The central motor 181 drives the first discharger 182 and the second discharger 183. The first discharger 182 and the second discharger 183 connected with both sides of the central motor 181 are established on the top of the opposite side to the opening portions 141 of the first reactor basin 140 and the second reactor basin 150, respectively. In the first discharger 182 and the second discharger 183, an opening surface 184 is established on the lateral sides thereof in the form of a conduit in the longitudinal direction, through which the purified supernatant in the first reactor basin 140 and the second reactor basin 150 are decanted.

Moreover, scum breakers 185, extending vertically from the circumferences of the opening surfaces 184 to the outside, are provided on the lateral portions of the first discharger 182 and the second discharger 183 so as to intercept the scum floating on the water surface while discharging the supernatant.

Meanwhile, the first discharger 182 and the second discharger 183 are rotated in the opposite direction to each other by the rotation of the central motor 181 to expose the respective opening surfaces 184 to the surface of the supernatant of the first reactor basin 140 and the second reactor basin 150 in turn, thus causing the decantation. Due to such alternate operations of the first discharger 182 and the second discharger 183, the frequency of decantation is increased and, accordingly, the retention time of the supernatant in the respective reactor basins to be discharged is shortened and the water depth is kept low, thus improving the decantation efficiency.

It is desirable that the central motor 181 be suspended while one of the opening surfaces 184 is exposed so as to maintain the decantation from one of the first reactor basin 140 and the second reactor basin 150.

Meanwhile, it is desirable that the opposite sides connected with the central motor 181 to the first reactor basin 140 and the second reactor basin 150 further extend with a conduit so as to decant the supernatant to a predetermined space.

The flow of the method for treating sewage using the apparatus 100 configured as described above will now be described below.

Figure 3:
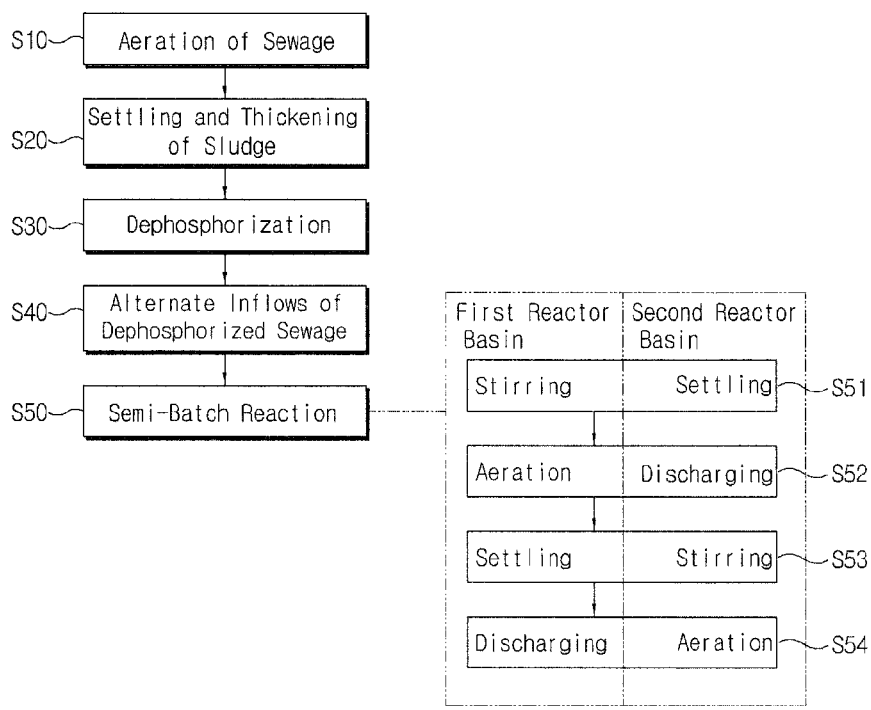
FIG. 3 is a flowchart illustrating how sewage is treated in the apparatus of FIG. 1.

FIG. 3 depicts a flowchart illustrating how sewage is treated in the apparatus 100 for the semi-batch treatment of sewage depicted in FIG. 1.

Referring to FIGS. 3 and 4, sewage is continuously aerated in an aerobic condition in the aeration tank 110 to nitrify the sewage (S10).

In the aeration step (S10), the nitrification process, in which ammonia nitrogen ($NH_{4+}$) of sewage is converted into nitrate nitrogen ($NO_{3-}$) by aerobic microorganisms included in sewage, occurs.

Next, sludge overflowing into the thickening tank 120 installed in the aeration tank 110 is continuously settled and thickened by gravity in an anoxic condition during the aeration step (S20).

In the settling and thickening step (S20), oxygen becomes exhausted to be converted into the anoxic condition during the process of settling and thickening.

After the settling and thickening step (S20), the thickened sludge in the bottom of the thickening tank 120 and raw water filled newly are continuously and upwardly transferred and stirred in the bottom of the dephosphorization tank 130 so that phosphorus is discharged by dephosphorizing bacteria in an anaerobic condition (S30).

In the dephosphorization step (S30), the anaerobic condition where oxygen and nitrate nitrogen $NO_{3-}$ do not exist is maintained and, accordingly, the dephosphorizing bacteria included in the thickened sludge release phosphorus using volatile fatty acid (VFA) included in the filled raw water.

That is, since the dephosphorization tank 130 receives the highly-thickened sludge, compared with the concentration of sludge in the aeration tank 110, from the thickening tank 120 and releases phosphorus in the dephosphorization step (S30), the dephosphorization process can be effectively achieved.

After the dephosphorization step (S30), the dephosphorized sewage overflowing from the dephosphorization tank 130 is distributed bidirectionally by the flow distribution pipe 160 to flow in the first reactor basin 140 and the second reactor basin 150 in turn (S40).

The flow of the dephosphorized sewage may be directed to the respective reactor basins in turn through the flow distribution pipe 160 based on the operations of the stirrers 170 and the difference of sludge compressibility of the respective reactor basins. That is, the flow of sewage is led to the reactor basin in which the stirrer 170 operates or to the reactor basin in the aeration condition, i.e., where sludge is not settled around the flow pipe 162 in a low pressure. Meanwhile, after the sewage inflow step (S40), while stirring, aeration, settling and discharging processes of filled sewage occur in turn in the first reactor basin 140, settling, discharging, stirring and aeration processes occur in turn in the second reactor basin 150 correspondingly thereto (S50).

As depicted in FIGS. 3 to 4, the semi-batch reaction process (S50) will now be described in more detail.

First, while dephosphorized sewage is introduced and stirred in the first reactor basin 140, the aerated sewage of the previous step is settled in the second reactor basin 150 without the inflow of the dephosphorized sewage and, accordingly, clear supernatant is formed on the top of the settled sludge (S51).

In the first reaction step (S51), while sewage is introduced and stirred in the first reactor basin 140, the sewage of the first reactor basin 140 flows in the second reactor basin 150 repeatedly, passing through the vent plate 142, the opening portion 141 and the aeration tank 110 by the water pressure difference between the respective reactor basins, whereas, the sewage is slowly settled in the second reactor basin 150 as the flow velocity is decreased while passing through the opening portion 141 and the vent plate 142 of the second reactor basin 150, thus not affecting the settling reaction of the second reactor basin 150.

After the first reaction step (S51), while the dephosphorized sewage is introduced in the first reactor basin 140 and the sewage stirred in the first reaction step (S51) is aerated, the aerated sewage is repeatedly aerated while passing through the aeration tank 110 and introduced in the second reactor basin 150, of which the water level is lower relatively and, accordingly, supernatant on the top of the settled sludge generated in the first reaction step (S51) overflows to be discharged by the inflow pressure (S52).

Here, the flow velocity of the aerated sewage flowing in the second reactor basin 150 is also decreased while passing through the opening portion 141 and the vent plate 142 of the second reactor basin 150 and, accordingly, the aerated sewage is slowly sedimented and only the supernatant is discharged.

The second reactor basin 150 in such discharging step has a flow of plug flow reactor (PFR) in which the aerated sewage is continuously flowing in one direction and the reacted sewage is continuously discharged in the other direction as the flow of the material introduced in the reactor basin is continuously changed based on the distance from the opening portion 141.

After the second reaction step (S52), while the inflow of the dephosphorized sewage is stopped in the first reactor basin 140 and the sewage aerated in the second reaction step (S52) is settled to generate clear supernatant on the top of the settled sludge, the dephosphorized sewage is introduced and stirred in the second reactor basin 150 (S53).

In the third reaction step (S53), like the first reaction step (S51), the flow velocity is decreased while passing through the aeration tank 110, the opening portion 141 and the vent plate 142 of the first reactor basin 140 by the water pressure difference between the respective reactor basins formed while sewage is introduced and stirred in the second reactor basin 150 and, accordingly, the sewage is slowly settled in the first reactor basin 140, thus not affecting the settling reaction of the first reactor basin 140.

After the third reaction step (S53), while the dephosphorized sewage flows in the second reactor basin 150 and the sewage stirred in the third reaction step (S53) is aerated, the aerated sewage is repeatedly aerated while passing through the aeration tank 110 and introduced in the first reactor basin 140, of which the water level is lower relatively and, accordingly, supernatant on the top of the settled sludge generated in the third reaction step (S53) overflows to be discharged by the inflow pressure (S54).

In the fourth reaction step (S54), like the second reaction step (S52), the aerated sewage flowing in the first reactor basin 140 is slowly sedimented as the flow velocity is decreased while passing through the opening portion 141 and the vent plate 142 of the first reactor basin 140 to discharge supernatant only, and the flow of sewage has a flow of plug flow reactor (PFR).

Meanwhile, as illustrated in FIG. 4, according to the method for treating sewage using a semi-batch process of the present invention, the whole quantity of the sewage continuously aerated in the aeration tank 110 passes through the dephosphorization tank 130 and flows in the respective reactor basins in turn.

While the sewage of the semi-batch reaction process (S50) is stirred or settled, the first reactor basin 140 and the second reactor basin 150 are being under the anoxic condition, respectively, where the denitrification reaction, in which nitrate nitrogen ($NO_3^-$) of sewage is converted into nitrogen gas ($N_2$) by denitrifying microorganisms included in sludge and the gas is exhausted to the air, occurs to remove nitrogenous compounds. Such anoxic condition is maintained while the supernatant is discharged in the second reaction step (S52) or the fourth reaction step (S54) to cause the denitrification reaction repeatedly by denitrifying microorganisms, thus removing the nitrogenous compounds additionally.

Moreover, while the sewage of the semi-batch reaction process (S50) is aerated, the first reactor basin 140 and the second reactor basin 150 is being under the aerobic condition, respectively, where the nitrification by aerobic microorganisms and the phosphorus absorption by dephosphorizing bacteria occur. While the aerated sewage is aerated repeatedly while passing through the aeration tank 110, the nitrification and the phosphorus absorption occur repeatedly in the aeration tank 110, thus providing effects of removing organic materials and phosphorus components of sewage repeatedly.

Meanwhile, it is possible to remove phosphorus effectively by getting rid of the sludge absorbing phosphorus in the first reactor basin 140, while the sewage of the first reactor basin 140 is aerated in the second reaction step (S52) and, further, it is possible to remove phosphorus effectively by getting rid of the sludge absorbing phosphorus in the second reactor basin 150, while the sewage of the second reactor basin 150 is aerated in the fourth reaction step (S54).

Moreover, it is possible to enhance the phosphorus absorptance of sludge in the first reactor basin 140 by increasing the stirring speed of the dephosphorization tank 130 while the sewage of the first reactor basin 140 is aerated in the second reaction step (S52) to increase the amount of overflowing dephosphorized sewage and dephosphorizing bacteria included therein. In the same manner, it is possible to improve the dephosphorization efficiency by increasing the stirring speed of the dephosphorization tank 130 while the sewage of the second reactor basin 150 is aerated in the fourth reaction step (S54) to increase the amount of overflowing dephosphorized sewage and dephosphorizing bacteria included therein.

To enhance the efficiencies of denitrification and phosphorus absorption of sewage in the semi-batch reaction process S50, after processing the first reaction step (S51) and the second reaction step (S52), the first reaction step (S51) and the second reaction step (S52) are repeated once more and, then, the third reaction step (S53) and the fourth reaction step (S54) may be carried out.

Meanwhile, the operation cycles for stirring, aeration, settling and discharging of the semi-batch reaction step (S50) in the first reactor basin 140 or the second reactor basin 150 in accordance with a preferred embodiment of the present invention may be set at 60 minutes, respectively, thus being set at 240 minutes in total.

Here, as another exemplary manner, it is possible to set the above discharging step at 55 minutes and set the rest 5 minutes as an idle step for preparing the next operation cycle. The operation cycles as described above can be controlled by a separate automatic control.

Moreover, if the first reaction step (S51) and the second reaction step (S52) are carried out twice, it is possible to perform the stirring, aeration, stirring and aeration steps by 30 minutes in turn in the corresponding operation cycles and to carry out the settling and discharging steps by 60 minutes, thus being set at 240 minutes in total. Here, it is also possible to set the discharging step at 55 minutes and set the rest 5 minutes as an idle step.

Such cycles including stirring, aeration, settling and discharging operation times may be varied based on sewage inflow concentration, inflow amount, water temperature, etc.

Next, reference will now be described with reference to experimental results on contaminant removal efficiencies, concentration changes in nitrogen and phosphorus and concentration changes in the reactor basins during the discharging steps according to the method for treating sewage in accordance with the preferred embodiment of the present invention.

Figure 5:
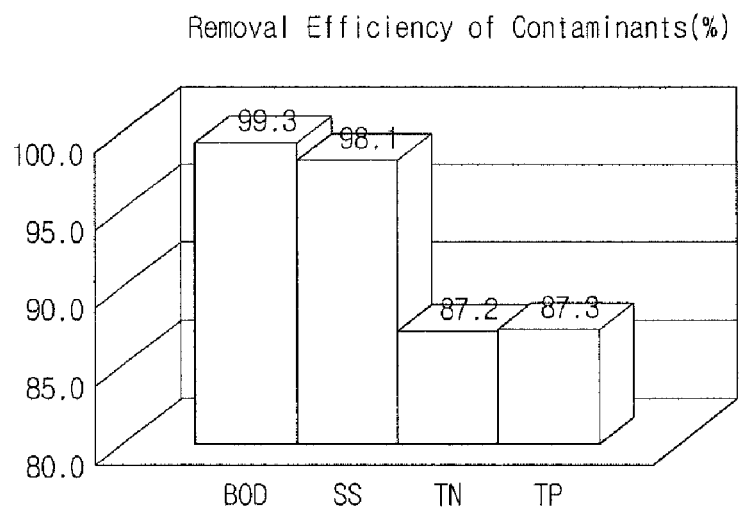
FIG. 5 is a graph showing contaminant removal efficiencies according to FIG. 3.

FIG. 5 is a graph showing contaminant removal efficiencies according to the method for treating sewage depicted in FIG. 3.

As depicted in the figure, the removed contaminants include organics (biological oxygen demand BOD), suspended solids (SS), total nitrogen (TN) and total phosphorus (TP), in which excellent properties for the treatment of contaminants are shown as the organics (BOD) and the suspended solids (SS) are removed over 98% and the phosphorus and nitrogenous compounds are removed over 87%.

Figure 6:
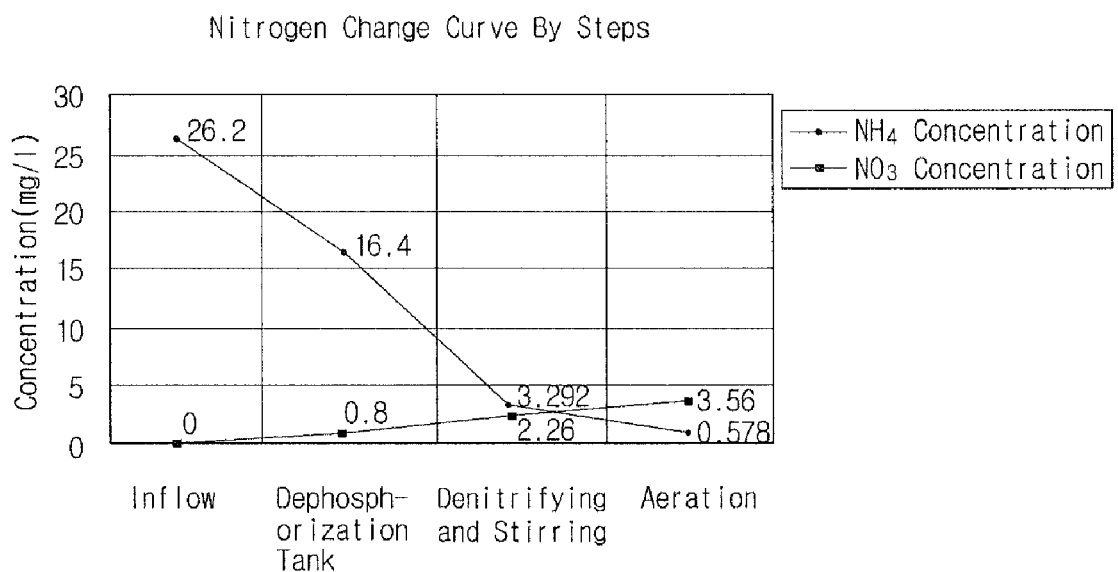
FIG. 6 is a graph showing nitrogen concentrations changed while the sewage in the dephosphorization and semi-batch reaction steps in FIG. 3 are stirred and aerated.

FIG. 6 depicts a graph showing nitrogen concentrations changed while the sewage in the dephosphorization step (S30) and the semi-batch reaction step (S50) are stirred and aerated according to the method for treating sewage depicted in FIG. 3.

As depicted in the figure, ammonia nitrogen ($NH_4^+$) in a concentration of 26.2 mg/l is included in the initially filled sewage, and the ammonia nitrogen is converted into nitrate nitrogen ($NO_3^-$) while such sewage is aerated in the aeration step (S10). The concentration of the ammonia nitrogen is decreased to 16.4 mg/l in the dephosphorization step (S30) and, further, it is diluted by the stirring of sewage in the semi-batch reaction step (S50) to be rapidly decreased to 3.3 mg/l approximately, thus being removed almost during the aeration.

The concentration of nitrate nitrogen ($NO_3^-$) is increased correspondingly to the decrease of ammonia nitrogen ($NH_4^+$), thus becoming the maximum by passing the nitrification process in the aeration step, however, the amount is very small and it can be removed by the denitrification reaction in the subsequent settling and discharging steps.

Figure 7:
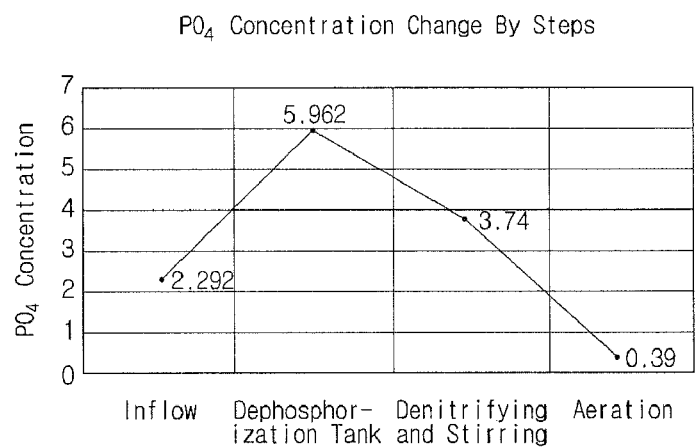
FIG. 7 is a graph showing phosphorus concentrations changed while the sewage in the dephosphorization and semi-batch reaction steps in FIG. 3 are stirred and aerated.

FIG. 7 depicts a graph showing phosphorus concentrations changed while the sewage in the dephosphorization step (S30) and the semi-batch reaction step (S50) are stirred and aerated according to the method for treating sewage depicted in FIG. 3.

As depicted in the figure, the phosphorus concentration of sewage is increased rapidly by the dephosphorization reaction of dephosphorizing bacteria in the dephosphorization step (S30), however, it is decreased as the sewage is diluted in the stirring step, and most phosphorus compounds is removed by the excessive intake of the dephosphorizing bacteria in the aeration step.

Figure 8:
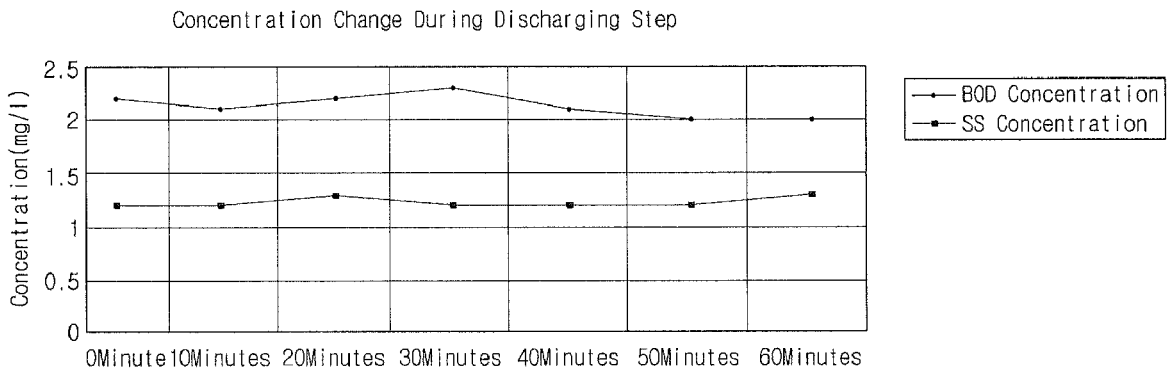
FIG. 8 is a graph showing concentration changes of organics (BOD) and suspended solids (SS) included in water discharged from the semi-batch reaction step in FIG. 3.

FIG. 8 depicts a graph showing concentration changes of organic (BOD) and suspended solids (SS) included in water discharged from the semi-batch reaction step (S50) in FIG. 3.

As depicted in the figure, it can be learned that the quality of the discharged water, i.e., the supernatant is excellent as the concentration changes of organics (BOD) and suspended solids (SS) included in the water discharged for 60 minutes in total are inconsiderable.

According to the apparatus 100 for the semi-batch treatment of sewage and the method thereof of the present invention, the removal efficiency of organics and suspended solids is high and the dephosphorization and denitrification efficiencies by the thickened sludge of the thickening tank 120 and the separate dephosphorization tank 130 are excellent compared with the sequencing batch reactor (SBR) process. Moreover, the present invention provides advantages in that it can increase the amount of the sewage treatment and it can cover the flux changes appropriately as it uses two semi-batch reactor basins for the alternate decantations of the decanter.

As described above, although the present invention has been described and illustrated with reference to preferred embodiments and drawings, it should be understood that various modifications and variations of the present invention can be made thereto by those skilled in the art without departing from the spirit and the technical scope of the present invention as defined by the appended claims.

The invention claimed is:

1. An apparatus for treating sewage using semi-batch, comprising:
    an aeration tank, in which an aeration unit aerating sewage continuously to be in an aerobic condition is installed;
    a thickening tank, of which the top is open, including side walls having a height lower than that of the aeration tank and arranged in the aeration tank, for continuously settling and thickening sludge of sewage aerated in the aeration tank and overflowing therein in an anoxic condition and, then, discharging the thickened sludge to the outside by a pump;
    a dephosphorization tank, including an anti-swirl plate established on the bottom thereof, of which the width narrows toward the top, for receiving upwardly raw water and the thickened sludge discharged from the thickening tank, stirring the same in an anaerobic condition, and continuously overflowing dephosphorized sewage through a weir established on the top circumference thereof;
    a first reactor basin and a second reactor basin, each including an opening portion, formed by opening a side wall thereof to be connected with a lateral portion of the aeration tank, and an aeration unit installed therein, the first reactor basin and the second reactor basin being arranged in parallel in the longitudinal direction;
    a flow distribution pipe including a start pipe, connected with a lateral portion of the weir of the dephosphorization tank and extending toward the bottom, and a pair of flow pipes, each extending from an end of the start pipe and curved to be parallel to the bottoms of the first reactor basin and the second reactor basin in the longitudinal direction and including an auxiliary pipe at one side thereof;
    a pair of stirrers, each being established at one side of the auxiliary pipes in each of the pair of flow pipes, operating in turn to stir the dephosphorized sewage overflowing from the dephosphorization tank to the first reactor basin and the second reactor basin alternately; and
    a decanter, installed across the top of the opposite side to the opening portions of the first reactor basin and the second reactor basin, for alternately decanting purified supernatant overflowing in turn from the first reactor basin and the second reactor basin.

2. The apparatus of claim 1,
    wherein each of the pair of flow pipes includes a plurality of vents arranged toward the respective bottoms of the first reactor basin and the second reactor basin in the longitudinal direction at regular intervals,
    and wherein each of the auxiliary pipes includes a bent pipe having a diameter smaller than that of the flow pipe and extending from the vent that is most adjacent to each of the opening portions of the first reactor basin and the second reactor basin and bent from the bottom to the top in a shape of "U", and a penetration pipe having a diameter larger than that of the bent pipe, connected with an extended end of the bent pipe and extending parallel to the flow pipe in the longitudinal direction; and wherein each of the pair of stirrers is established between the opening portion and the penetration pipe in the first reactor basin and the second reactor basin, the pair of stirrers operating in turn so that a flow path is formed inside the single penetration pipe to cause a pressure difference between the pair of flow pipe, while the single stirrer performs the stirring process toward the single penetration pipe corresponding to the lateral portion thereof, thus leading the sewage to flow in the single reactor basin, where the single stirrer operates, and the single flow pipe provided in the single reactor basin.

3. The apparatus of claim 1, wherein the opening portion, included in the aeration tank, has a shape in that the width narrows toward the aeration tank and includes a vent plate having a plurality of vents established on an end that has the maximum width of the opening portion.

4. The apparatus of claim 1, wherein the decanter includes a central motor, a first discharger and a second decanter, the first discharger and the second discharger being connected with both sides of the central motor and established on the top of the opposite side to the first reactor basin and the second reactor basin, and including an opening surface established on the lateral sides thereof in the form of a conduit, respectively, the first discharger and the second discharger being rotated in the opposite direction to each other by the rotation of the central motor to expose the respective opening surfaces to the surface of supernatant of the first reactor basin and the second reactor basin in turn, and the central motor being suspended while one of the opening surfaces is exposed so as to maintain decantation from one of the first reactor basin and the second reactor basin.

5. The apparatus of claim 1, wherein the dephosphorization tank is provided in the aeration tank and includes a side wall having a height higher than that of the aeration tank so that the dephosphorized sewage overflowing through the weir may not be mixed with the sewage aerated in the aeration tank.

6. The apparatus of clam 1, wherein the aeration unit includes an aeration pipe, through which oxygen is supplied from the outside, established on the aeration tank, the first reactor basin and the second reactor basin, and a plurality of nozzles, through which oxygen is discharged, provided on the top of the aeration pipe at regular intervals.

7. A method for treating sewage using semi-batch, the method comprising:

a step of aerating sewage continuously to be nitrified in an aerobic condition in an aeration tank;

a step of settling sludge overflowing into a thickening tank established in the aeration tank continuously in an anoxic condition to be thickened during the step of aerating;

a step of releasing phosphorus by dephosphorizing bacteria in an anaerobic condition by continuously and upwardly transferring and stirring the sludge thickened in the bottom of the thickening tank together with newly-filled raw water;

a step of distributing dephosphorized sewage overflowing from the dephosphorization tank bidirectionally by a flow distribution pipe to flow in a first reactor basin and a second reactor basin in turn; and a semi-batch reaction step, in which, while stirring, aeration, settling and discharging processes of filled sewage occur in turn in the first reactor basin, settling, discharging, stirring and aeration processes occur in turn in the second reactor basin correspondingly thereto.

8. The method of claim 7, wherein the semi-batch reaction step comprises:

a first reaction step, in which, while the dephosphorized sewage is introduced and stirred in the first reactor basin, aerated sewage of the previous step is settled in the second reactor basin without an inflow of the dephosphorized sewage to generate clear supernatant in the top of the settled sludge;

a second reaction step, in which, while the dephosphorized sewage flows in the first reactor basin and the sewage stirred in the first reaction step is aerated, the aerated sewage is repeatedly aerated while passing through the aeration tank and flows in the second reactor basin, of which the water level is lower relatively and, accordingly, supernatant on the top of the settled sludge generated in the first reaction step overflows to be discharged by the inflow pressure;

a third reaction step, in which, while the inflow of the dephosphorized sewage is stopped in the first reactor basin and the sewage aerated in the second reaction step is settled to generate clear supernatant on the top of the settled sludge, the dephosphorized sewage is introduced and stirred in the second reactor basin; and a fourth reaction step, in which, while the dephosphorized sewage flows in the second reactor basin and the sewage stirred in the third reaction step is aerated, the aerated sewage is repeatedly aerated while passing through the aeration tank and flows in the first reactor basin, of which the water level is lower relatively and, accordingly, supernatant on the top of the settled sludge generated in the third reaction step overflows to be discharged by the inflow pressure.

9. The method for of claim 8, wherein, while the sewage is stirred or settled, the first reactor basin and the second reactor basin are being under the anoxic condition, respectively, where the denitrification reactions by denitrifying microorganisms occur, wherein, while the sewage is aerated, the first reactor basin and the second reactor basin are being under the aerobic condition, respectively, where nitrifications by aerobic microorganisms and phosphorus absorptions by dephosphorizing bacteria occur, wherein, while the aerated sewage is repeatedly aerated while passing through the aeration tank, the nitrification and the phosphorus absorption occur repeatedly, and wherein, while the supernatant is discharged, the first reactor basin and the second reactor basin are being under the anoxic condition, respectively, where the denitrification reactions by the denitrifying microorganisms occur.

10. The method for of claim 9, wherein phosphorus is removed by getting rid of the sludge absorbing phosphorus in the first reactor basin, while the sewage of the first reactor basin is aerated in the second reaction step, and wherein phosphorus is removed by getting rid of the sludge absorbing phosphorus in the second reactor basin, while the sewage of the second reactor basin is aerated in the fourth reaction step.

11. The method of claim 9, wherein, while the sewage of the first reactor basin is aerated in the second reaction step, the stirring speed of the dephosphorization tank is increased to raise the amount of overflowing dephosphorized sewage, thus enhancing an efficiency of phosphorus absorption of sludge in the first reactor basin, and wherein while the sewage of the second reactor basin is aerated in the fourth reaction step, the stirring speed of the dephosphorization tank is increased to raise the amount of overflowing dephosphorized sewage, thus enhancing an efficiency of phosphorus absorption of sludge in the second reactor basin.

12. The method of claim 8, wherein, after performing the first reaction step and the second reaction step, the first reaction step and the second reaction step are repeated once more and, then, the third reaction step is carried out.

* * * * *